US012759191B2

(12) United States Patent
Conway et al.

(10) Patent No.: US 12,759,191 B2
(45) Date of Patent: Oct. 13, 2026

(54) METHODS OF FABRICATION OF GRAPHITE POWDER MOLDS

(71) Applicant: CORNING INCORPORATED, Corning, NY (US)

(72) Inventors: Bethany Rose Conway, Lindley, NY (US); James Scott Sutherland, Painted Post, NY (US); James William Zimmerman, Corning, NY (US)

(73) Assignee: CORNING INCORPORATED, Corning, NY (US)

(*) Notice: Subject to any disclaimer, the term of this patent is extended or adjusted under 35 U.S.C. 154(b) by 290 days.

(21) Appl. No.: 18/490,972

(22) Filed: Oct. 20, 2023

(65) Prior Publication Data

US 2024/0173889 A1 May 30, 2024

Related U.S. Application Data

(60) Provisional application No. 63/428,593, filed on Nov. 29, 2022.

(51) Int. Cl.
*B28B 7/34* (2006.01)
*B28B 7/00* (2006.01)

(52) U.S. Cl.
CPC ............ *B28B 7/346* (2013.01); *B28B 7/0097* (2013.01)

(58) Field of Classification Search
CPC .............................. B28B 7/346; C04B 35/536
See application file for complete search history.

(56) References Cited

U.S. PATENT DOCUMENTS

| | | | | |
|---|---|---|---|---|
| 3,279,917 | A | 10/1966 | Ballard et al. | |
| 3,467,745 | A | 9/1969 | Lambertson et al. | |
| 4,153,666 | A | 5/1979 | Alliegro | |
| 5,190,696 | A * | 3/1993 | Fujii | C04B 35/536 264/105 |
| 6,508,964 | B2 | 1/2003 | Kobayashi et al. | |
| 2004/0041294 | A1 | 3/2004 | Horiuchi et al. | |
| 2005/0142023 | A1 | 6/2005 | Voice et al. | |
| 2010/0144510 | A1* | 6/2010 | Sepulveda | B28B 1/04 977/773 |
| 2018/0345361 | A1 | 12/2018 | Öttinger et al. | |

(Continued)

FOREIGN PATENT DOCUMENTS

| | | | |
|---|---|---|---|
| CN | 201989217 | U | 9/2011 |
| CN | 101774210 | B | 10/2011 |
| DE | 102012006572 | A1 | 7/2013 |

(Continued)

OTHER PUBLICATIONS

Grafoil Flexible Graphite TDS (Year: 2020).*

(Continued)

*Primary Examiner* — Virak Nguon
(74) *Attorney, Agent, or Firm* — Yiqun Zhao; Ye Eun Park

(57) ABSTRACT

The disclosure relates to methods of fabricating of a graphite powder mold, including: applying a base layer to an exposed surface of a mold having one or more features; depositing a graphite powder onto the base layer to fill the one or more features; applying a cover layer onto an exposed surface of the graphite powder, wherein the cover layer and the base layer join at intersecting surfaces encasing the graphite powder to form the graphite powder mold having one or more raised features

14 Claims, 12 Drawing Sheets

(56) References Cited

U.S. PATENT DOCUMENTS

| | | | | |
|---|---|---|---|---|
| 2019/0345052 | A1* | 11/2019 | Scoggins | ............ C04B 35/5615 |
| 2022/0314488 | A1 | 10/2022 | Conway et al. | |

FOREIGN PATENT DOCUMENTS

| | | | |
|---|---|---|---|
| JP | 2012-254479 | A | 12/2012 |
| JP | 5284706 | B2 | 9/2013 |
| JP | 6046206 | B2 | 12/2016 |

OTHER PUBLICATIONS

Munro, Ronald G., "Material Properties of a Sintered a-SiC," Journal of Physical and Chemical Reference Data, 26, 1195 (1997), 10 pages.

International Search Report and Written Opinion of the International Searching Authority; PCT/US2023/037183; dated May 10, 2024; 24 pages; European Patent Office.

* cited by examiner

METHODS OF FABRICATION OF GRAPHITE POWDER MOLDS

CROSS-REFERENCE TO RELATED APPLICATIONS

This application claims the benefit of priority of U.S. Provisional Application Ser. No. 63/428,593 filed on Nov. 29, 2022, the content of which is relied upon and incorporated herein by reference in its entirety.

FIELD OF THE DISCLOSURE

The disclosure relates to methods of fabricating of ceramic structures, and more particularly to methods of fabricating ceramic structures having profiled surfaces and more particularly to methods of fabrication of graphite powder molds for fabricating ceramic structures having profiled surfaces.

BACKGROUND

Ceramics such as silicon carbide or boron carbide are desirable materials for forming complex parts with profiled shaped for various industries. SiC, for example, has relatively high elastic module, high thermal conductivity, useful in performing and controlling endothermic or exothermic reactions as well as good physical durability, thermal shock resistance and chemical corrosion resistance. These properties are useful, for example, in aerospace and defense applications requiring stiff, lightweight mirror blanks for high frequency mirror scanning and low weight airborne and space imaging systems. However, these properties, combined with high hardness and abrasiveness, also make the practical production of complex profiled ceramic structures challenging.

Accordingly, there is a need for improved methods of fabricating stiff, lightweight ceramic structures having profiled surfaces.

SUMMARY OF THE DISCLOSURE

According to a first embodiment of the present disclosure, a method of forming includes: applying a base layer to an exposed surface of a mold having one or more features; depositing a graphite powder onto the base layer to fill the one or more features: applying a cover layer onto an exposed surface of the graphite powder, wherein the cover layer and the base layer join at intersecting surfaces encasing the graphite powder to form the graphite powder mold having one or more raised features.

A second embodiment of the present disclosure includes the first embodiment, wherein the base layer and the cover layer comprise an adhesive material.

A third embodiment of the present disclosure includes the second embodiment, wherein at least one of the base layer or cover layer comprises graphite powder.

A fourth embodiment of the present disclosure includes the second embodiment, wherein the adhesive layer has a thickness of about 0.1 to about 1.0 mm.

A fifth embodiment of the present disclosure includes the second embodiment, further comprising: curing the base layer prior to depositing graphite power onto the layer; and curing the cover layer after applying the cover layer onto the exposed surface of the graphite powder.

A sixth embodiment of the present disclosure includes the second embodiment, further comprising curing the base layer and the cover layer simultaneously.

A seventh embodiment of the present disclosure includes the first embodiment, wherein the base layer comprises a grafoil sheet having one or more features to match the one or more features of the mold.

An eighth embodiment of the present disclosure includes the seventh embodiment wherein the cover layer comprises a flat grafoil sheet bonded to the base layer at intersecting surfaces by an adhesive material.

A ninth embodiment of the present disclosure includes the eighth embodiment, wherein the adhesive material comprises graphite powder.

A tenth embodiment of the present disclosure includes the first embodiment, wherein one of the base layer or the cover layer comprises an adhesive material and the other of the base layer or the cover layer comprises a grafoil sheet.

An eleventh embodiment of the present disclosure includes the tenth embodiment, wherein the base layer comprises an adhesive material and the cover layer comprises a flat grafoil sheet.

A twelfth embodiment of the present disclosure includes the tenth embodiment, wherein the base layer comprises a grafoil sheet having one or more features to match the one or more features of the mold and the cover layer comprises an adhesive material.

A thirteenth embodiment of the present disclosure includes the first embodiment, wherein the base layer comprises one of a paper material or a polymer material, the base layer having one or more features to match the one or more features of the mold, and wherein the cover layer comprises one of the paper material or the polymer material.

A fourteenth embodiment of the present disclosure includes any of the first embodiment to thirteenth further comprising: inserting the graphite powder mold into a hot-pressing die, wherein the graphite powder mold comprises a first surface having the one or more raised features and second surface opposite the first surface having one or more depressed features corresponding to the one or more raised features of the first surface, pouring a first layer of fill material into the hot-pressing die, wherein the fill material at least covers the one or more raised features of the graphite powder mold, applying a first pressure to the fill material in a direction perpendicular to the first surface, applying a second pressure to the graphite powder mold in a direction perpendicular to the second surface while applying the first pressure, and heating the fill material while applying the first pressure and second pressure to compress the fill material in a direction of the thickness of the fill material to form a final part.

A fifteenth embodiment of the present disclosure includes the fourteenth embodiment, further comprising: removing the final part from the hot-pressing die, and removing the graphite powder mold to expose the features of the final part.

According to a sixteenth embodiment of the present disclosure, a mold includes: a first surface: a second surface opposing the first surface: a side wall connecting the first surface to the second surface, wherein the side wall defines a thickness of the mold, wherein the first surface comprises one or more raised features, wherein the second surface comprises one or more depressed features corresponding to the one or more raised features of the first surface, wherein the first surface, second surface and the sidewall enclose a volume: and a graphite powder filling the volume.

A seventeenth embodiment of the present disclosure includes the sixteenth embodiment, wherein the first surface and the second surface comprise an adhesive material.

An eighteenth embodiment of the present disclosure includes the seventeenth embodiment, wherein at least one of the first surface or the second surface comprises graphite powder.

A nineteenth embodiment of the present disclosure includes the sixteenth embodiment, wherein the first surface has a thickness of about 0.1 to about 1.0 mm.

A twentieth embodiment of the present disclosure includes the sixteenth embodiment, wherein the second surface has a thickness of about 0.1 to about 1.0 mm.

A twenty-first embodiment of the present disclosure includes the sixteenth embodiment, wherein the first surface and the second surface comprise a grafoil sheet.

A twenty-second embodiment of the present disclosure includes the sixteenth embodiment, wherein one of the first surface or the second surface comprises an adhesive material and the other of the first surface or the second surface comprises a grafoil sheet.

According to a twenty-third embodiment of the present disclosure, a method of forming a graphite powder mold, includes: pouring a mixture of graphite powder and binder into a cold pressing die: applying a force to compress the mixture into a graphite powder disk: removing the graphite powder disk from the die: machining the graphite powder disk to form one or more features on the graphite powder disk.

Additional features and advantages will be set forth in the detailed description which follows, and will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary and are intended to provide an overview or framework to understanding the nature and character of the disclosure and the appended claims.

The accompanying drawings are included to provide a further understanding of principles of the disclosure, and are incorporated in, and constitute a part of, this specification. The drawings illustrate one or more embodiment(s) and, together with the description, serve to explain, by way of example, principles and operation of the disclosure. It is to be understood that various features of the disclosure disclosed in this specification and in the drawings can be used in any and all combinations. By way of non-limiting examples, the various features of the disclosure may be combined with one another according to the following embodiments.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Figure 1A:
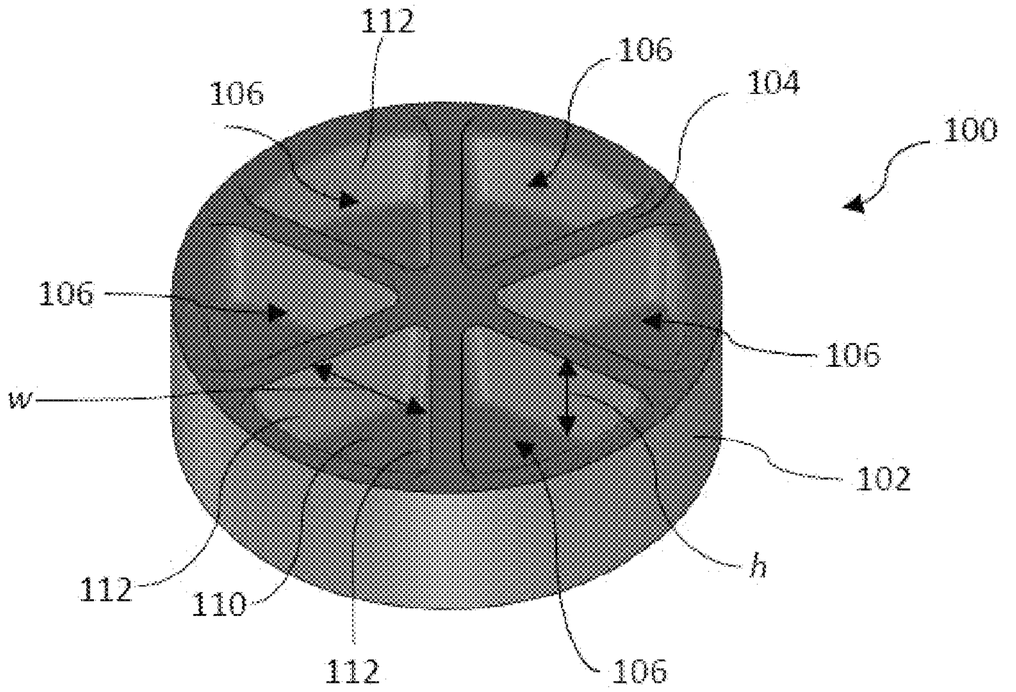
FIG. 1A-1B is a perspective external view of an exemplary ceramic article with at least one featured surface, in accordance with some embodiments of the current disclosure.

Additional features and advantages will be set forth in the detailed description which follows and will be apparent to those skilled in the art from the description or recognized by practicing the embodiments as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone: B alone: C alone: A and B in combination: A and C in combination: B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

For purposes of this disclosure, the term "coupled" (in all of its forms: couple, coupling, coupled, etc.) generally means the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an endpoint of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Directional terms as used herein—for example up, down, right, left, front, back, top, bottom, above, below, and the like—are made only with reference to the figures as drawn and are not intended to imply absolute orientation.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 1B:
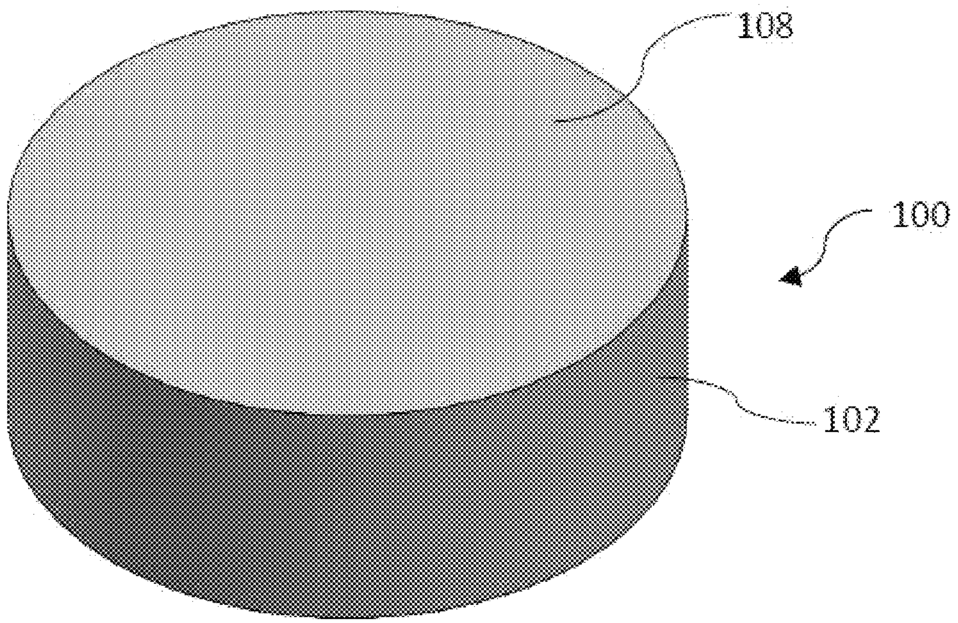

FIG. 1A-1B depicts an exemplary ceramic article 100 with at least one featured surface. The article 100 comprises a monolithic closed-porosity ceramic body 102 with a first surface 104 having a plurality of features 106 shaped into the first surface 104 of the body 102. The term "monolithic" is defined herein, refers to a ceramic structure, with one or more features therein, in which no (other than the feature(s)) inhomogeneities, openings, or interconnected porosities are present in the ceramic structure. "Monolithic" as used herein has the meaning provided above. However, monolith may be otherwise defined if expressly so stated, such as in the claims, where monolithic may alternatively be defined as a body of sintered polycrystalline ceramic material with a continuous chain of grains ionically or covalently bonded to one another yet where the body may include internal passages and interstitial pores between grains, and optionally where most interstitial pores have a maximum crosswise dimension of less than one micron, such as less than 0.5 microns, and/or where the body is free of components (e.g. halves of the body) bonded to one another by Van der Waal forces. While the embodiments of FIG. 1A-1B depicts a body 102 having six features 106, the body 102 may have more, or less, features than shown in FIG. 1A. The plurality of features 106 may be distributed in any arbitrary pattern, where the goal is reducing weight by eliminating material that is not needed to allow the article to meet mechanical stiffness requirements. FIG. 1B depicts a second surface 108, opposing the first surface 104, of the body 102. In the embodiments depicted in FIG. 1B, the second surface 108 is a flat surface without any features formed therein. In some embodiments, features may also be formed in the second surface 108. In some embodiments, the second surface 108 may have a concave surface feature, a convex surface feature, or a parabolic profile.

According to further embodiments, the exemplary ceramic article 100 has a density of 90% to 99% of a theoretical maximum density of the chosen ceramic material, or preferably 92% to 97% of theoretical maximum density of the chosen ceramic material, or preferably 95% to 97% of theoretical maximum density of the chosen ceramic material. The theoretical maximum density (also known as maximum theoretical density, theoretical density, crystal density, or x-ray density) of a polycrystalline material, such as SiC, is the density of a perfect single crystal of the sintered material. Thus, the theoretical maximum density is the maximum attainable density for a given structural phase of the sintered material.

In an exemplary embodiment, the ceramic material is α-SiC with a hexagonal 6H structure. The theoretical maximum density of sintered SiC(6H) is $3.214 \pm 0.001$ g/cm$^3$. Munro, Ronald G., "Material Properties of a Sintered α-SiC," Journal of Physical and Chemical Reference Data, 26, 1195 (1997). The ceramic material in other embodiments includes a different crystalline form of SiC or a different ceramic altogether. The theoretical maximum density of other crystalline forms of sintered SiC can differ from the theoretical maximum density of sintered SiC(6H), for example, within a range of 3.166 to 3.214 g/cm$^3$. Similarly, the theoretical maximum density of other sintered ceramics also differs from that of sintered SiC(6H). As used herein, a "high density" ceramic body is a ceramic body in which the sintered ceramic material of the ceramic body has a density of at least 95% of the theoretical maximum density of the ceramic material.

The feature 106, according to some embodiments as depicted in FIG. 1A, comprises a depressed floor 110 and a plurality of sidewalls 112 joining the floor 108. The top of the sidewalls 112 have a height h above the depressed floor 110. The sidewalls 112 are separated by a width w measured perpendicular to the height h. Further, width w is measured at a position corresponding to one-half of the height h. The sidewalls 112 may also include a draft angle, such as 1-5°. In embodiments. the sidewalls 112 include fillets where the sidewalls 112 meet the depressed floor 110, where the fillet radius is, for example, 10% to 100% of the sidewall height h. In embodiments, fillets may also be provided where sidewalls 112 meet each other and the perimeter wall, where the fillets have a radius that is, for example, 1% to 30% the length of the radial sidewalls. In some embodiments, the feature may be a high aspect ratio feature where the ratio of the height (or depth) to the width of the feature is 2:1, or 4:1, or 8:1, or 12:1.

Figure 2:
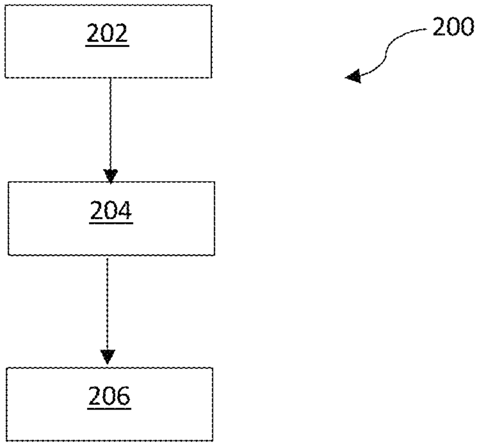
FIG. 2 is a flowchart of an exemplary process 200 for forming a graphite powder mold which can be used to form a featured ceramic article, such as the featured ceramic article shown in FIG. 1A-1B, in accordance with some embodiments of the current disclosure.

FIG. 2 depicts a flowchart of an exemplary process 200 for forming a graphite powder mold which can be used to form a featured ceramic article, such as the featured ceramic article shown in FIG. 1A-1B.

Figure 3A:
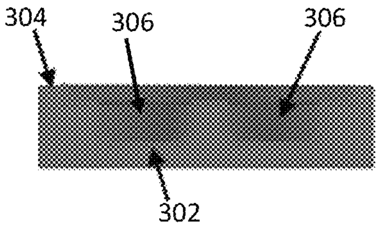
FIG. 3A-3D, depict an exemplary process for forming a graphite powder mold as described with respect to FIG. 2, in accordance with some embodiments of the current disclosure.
Figure 3B:
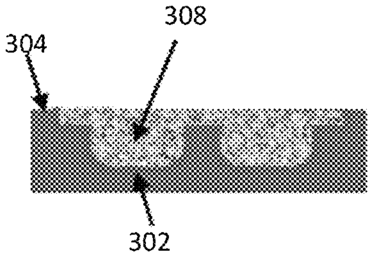
Figure 3C:
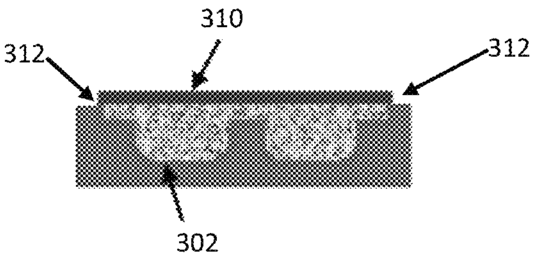
Figure 3D:
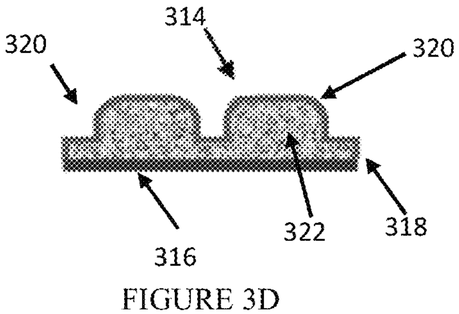

FIG. 2 depicts a flowchart of an exemplary process 200 for forming a graphite powder mold. FIG. 3A-D depicts the exemplary process 200 for forming a graphite powder mold. In some embodiments, the process 200 begins at step 202, and as shown in FIG. 3A, by applying a base layer 302 to an exposed surface of a mold 304 having one or more features 306. Next at step 204, and as depicted in FIG. 3B, a graphite powder 308 is deposited onto the base layer 302 to fill the one or more features 306. Next, at step 206, and as depicted in FIG. 3B, a cover layer 310 is applied onto an exposed surface of the graphite powder 308. The cover layer 310 and the base layer 302 join at intersecting surfaces 312 to encase the graphite powder 308 to form the graphite powder mold 312, as shown in FIG. 3D, having one or more raised features. The graphite powder mold as shown in FIG. 3D comprises a first surface 314 and a second surface 316 opposing the first surface 314 and a side wall 318 connecting the first surface 314 to the second surface 316. The side wall 318 defines a thickness of the mold. The first surface 314 has one or more raised features 320. The first surface 314, second surface 316 and the sidewall 318 enclose a volume 322 having a graphite powder filling the volume 322.

In embodiments, the base layer 302 is an adhesive material such as glue. In embodiments, the adhesive material contains graphite powder. In embodiments, the adhesive material can be brushed onto the exposed surface of the mold 304. In embodiments, the mold 304 can be dipped into an adhesive material to coat the exposed surfaces of the mold 304 with the adhesive material. In embodiments, after the adhesive material is cured and solidifies, it can have a thickness of about 0.1 mm to about 1.0 mm.

In embodiments, the cover layer 310 is also an adhesive material such as glue. In embodiments, the adhesive material contains graphite powder. In embodiments, the adhesive material can be brushed onto the exposed surface of the graphite powder 308. In embodiments, the mold 304 can be dipped into an adhesive material to coat the exposed surfaces of the graphite powder 308 with the adhesive material. In embodiments, after the adhesive material is cured and solidifies, it can have a thickness of about 0.1 mm to about 1.0 mm. In embodiments, the adhesive material of the base layer 302 and the cover layer 310 can be cured simultaneously. In embodiments, the base layer 302 can be cured prior to depositing a graphite powder 308 deposited onto the base layer 302 to fill the one or more features 306 and the cover layer 310 can be cured after application onto an exposed surface of the graphite powder 308.

In embodiments, the base layer 302 is a grafoil sheet having one or more features to match the one or more features of the mold 304. In embodiments, the cover layer 310 is a grafoil sheet. In embodiments, where the base layer 302 is a flat grafoil sheet and the cover layer 310 is a grafoil sheet, the cover layer 310 is bonded to the base layer 302 at intersecting surfaces by an adhesive material. In embodiments, the adhesive material the adhesive material contains graphite powder. In embodiments, one of the base layer 302 or cover layer 310 is an adhesive material and the other of the base layer or the cover layer is a grafoil sheet. In embodiments, one of the base layer 302 or cover layer 310 is a grafoil sheet and the other of the base layer or the cover layer is an adhesive material. In embodiments, the base layer 302 is one of a paper material or a polymer material and the cover layer 310 is one of a paper material or a polymer material.

Figure 4:
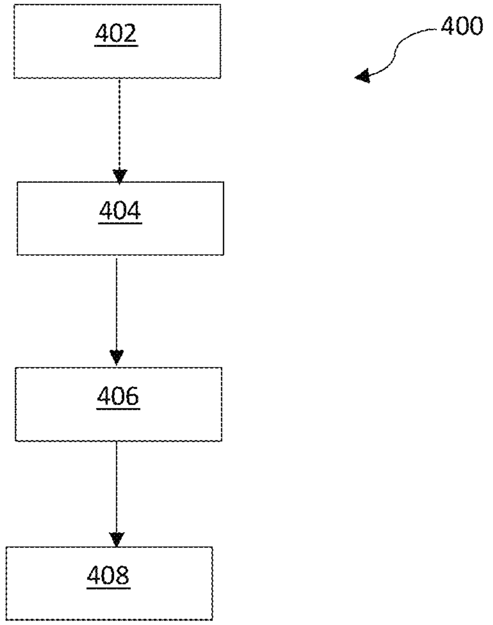
FIG. 4 depicts a flowchart of another exemplary process for forming a graphite powder mold, in accordance with some embodiments of the current disclosure.
Figure 5A:
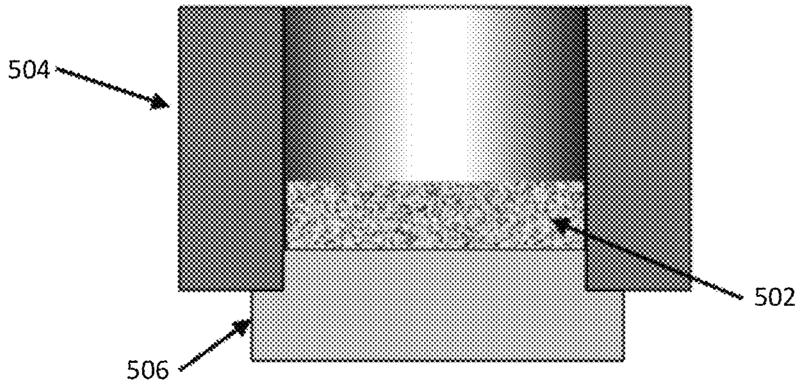
FIG. 5A-5D depict an exemplary process for forming a graphite powder mold as described with respect to FIG. 4, in accordance with some embodiments of the current disclosure.
Figure 5B:
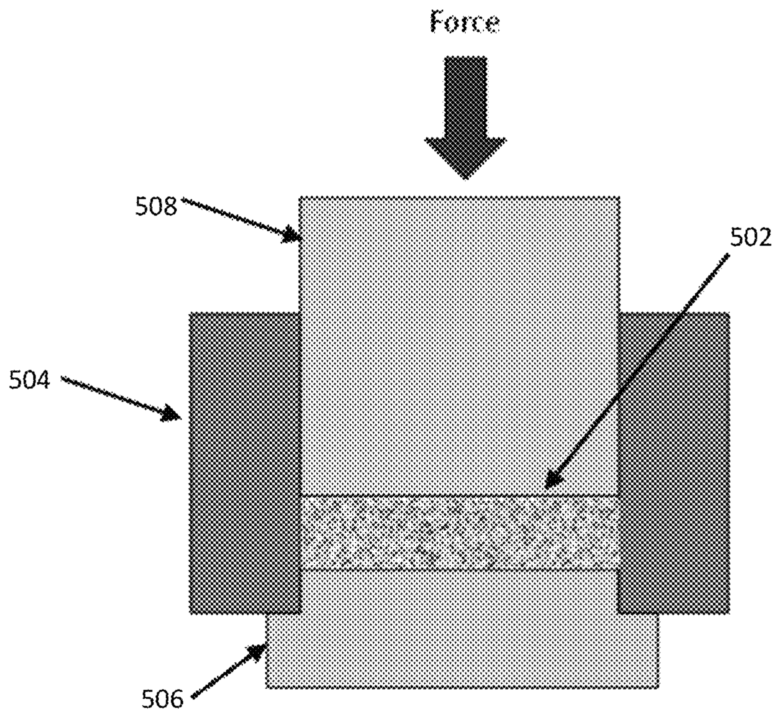
Figure 5C:
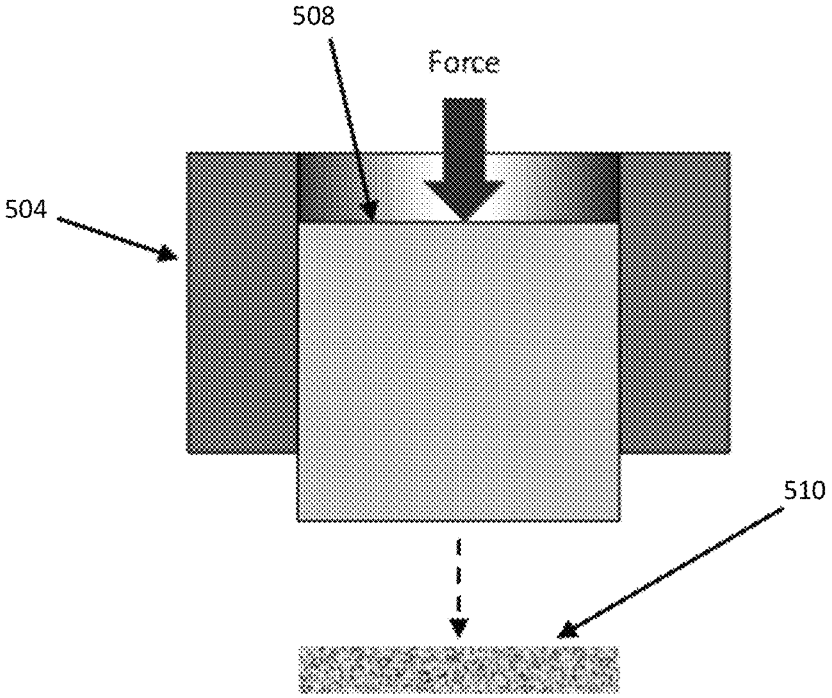
Figure 5D:
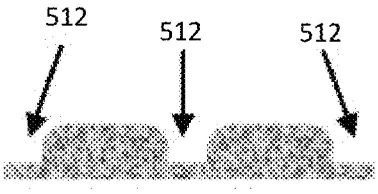

FIG. 4 depicts a flowchart of another exemplary process 400 for forming a graphite powder mold. FIG. 5A-D depicts the exemplary process 400 for forming a graphite powder mold. In some embodiments, the process 400 begins at step 402, and as shown in FIG. 5A, by pouring a mixture 502 of graphite powder and binder into a cold pressing die 504 having a base 506. Next at step 404, and as shown in FIG. 5B, a force is applied to the mixture 502 (e.g. via a ram 508) to compress the mixture into a graphite powder disk 510. Next at step 406, and as shown in FIG. 5C, the graphite powder disk 510 is removed from the die 504. Next at step 408, and as shown in FIG. 5D, the graphite powder disk 510 is machined (e.g. CNC machined) to form one or more features 512 on the graphite powder disk. In embodiments, exemplary features include depressed portions between and alongside of raised portions of graphite powder disk. In embodiments, after pressing, the graphite powder disk can be fully or partially debound to increase the strength of the pressed powder disk and reduce chipping during machining.

Figure 6:
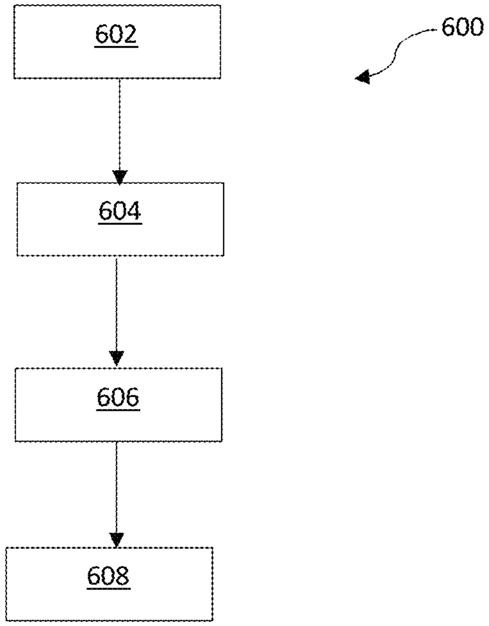
FIG. 6 depicts a flowchart of another exemplary process for forming a graphite powder mold, in accordance with some embodiments of the current disclosure.
Figure 7A:
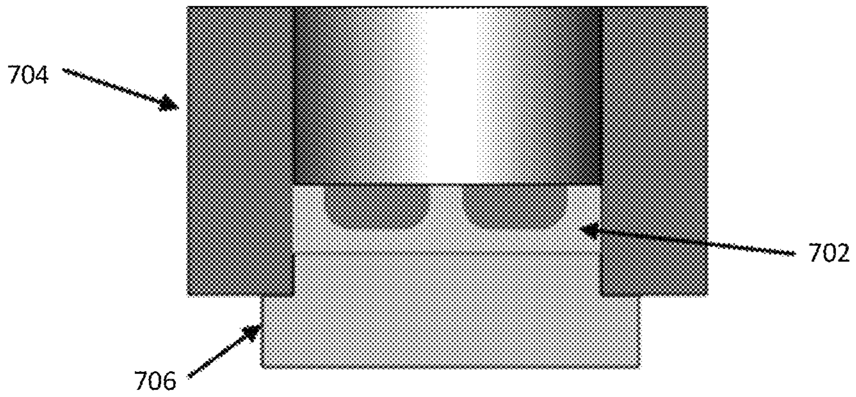
FIG. 7A-7C depict an exemplary process for forming a graphite powder mold as described with respect to FIG. 6, in accordance with some embodiments of the current disclosure.
Figure 7B:
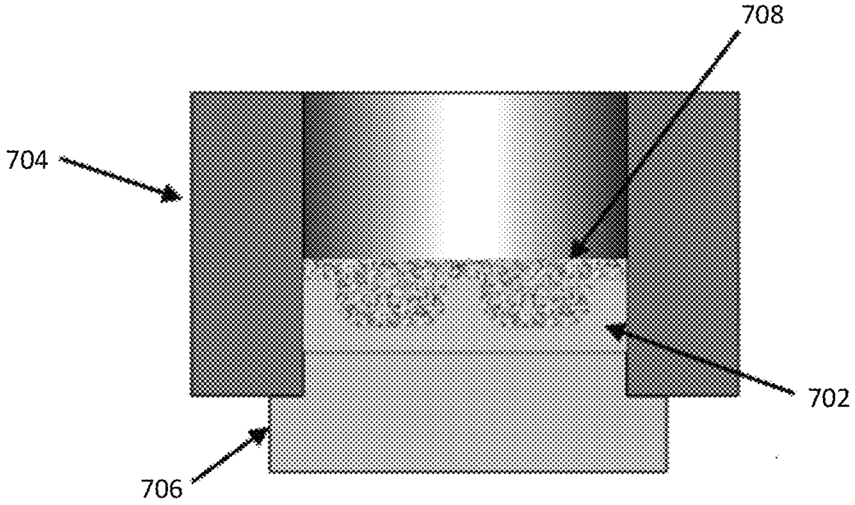
Figure 7C:
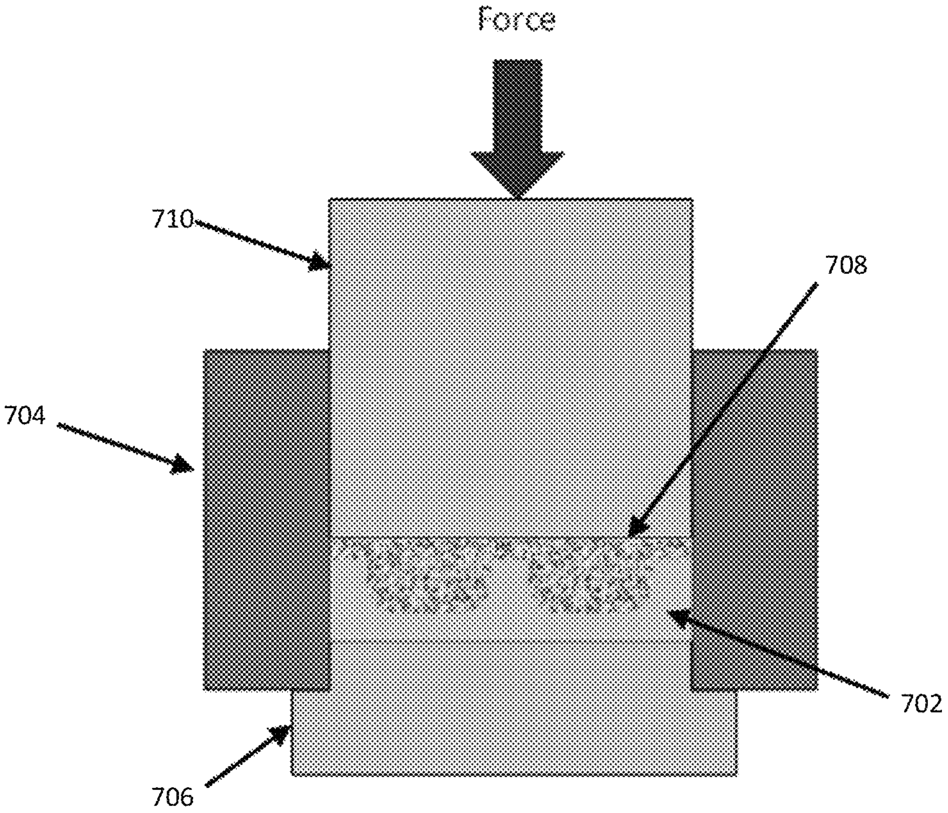

FIG. 6 depicts a flowchart of another exemplary process 600 for forming a graphite powder mold. FIG. 7A-7C depicts the exemplary process 600 for forming a graphite powder mold. In some embodiments, the process 600 begins at step 602, and as shown in FIG. 7A, by placing a wax form 702 inside a cold pressing die 704 so that it rests on the bottom surface 706 of the die 704. The wax form is fabricated by melting a wax that is compatible with crack-free cold pressing and pouring the wax into a silicone mold having desired features. The silicone mold and the wax are put into a vacuum chamber so that any bubbles in the wax expand and rise to the surface of the molten wax and are released. The wax is allowed to cool and solidify, and then it is removed from the silicone mold. Next at step 604, and as shown in FIG. 7B, a graphite powder mixture 708 is poured into the die 704 so that it covers the wax form 702. In embodiments, the graphite powder mixture 708 is prepared by mixing graphite powder with a binder (e.g., phenolic resin) and a solvent (e.g., ethanol) in a planetary mixer. After mixing mixed material is spread on a tray and dried in an over oven night at 100° C. The dried material is crushed and sieved through a 60-mesh sieve, producing particles with diameters of less than 250 um. Next at step 606, and as shown in FIG. 7C, a ram 710 is placed in the die 704 and the graphite powder mixture 708 is pressed into the wax form 702 so that they both compress. The graphite powder mixture 708 compresses so that the binder holds the graphite powder together as a solid graphite powder mold 712. Next at step 608, the graphite powder mold 712 and the wax form 702 are removed from the die. The wax form 702 is removed by heating the graphite powder mold 712 in an oven (e.g. at 100° C. for 30 minutes). In embodiments, the graphite powder mold 712 is debound by heating in flowing nitrogen ($N_2$) at 600° C. The graphite powder mold formed as described in the embodiments above is used to form a featured ceramic article as depicted in FIG. 1A-1B.

Figure 8A:
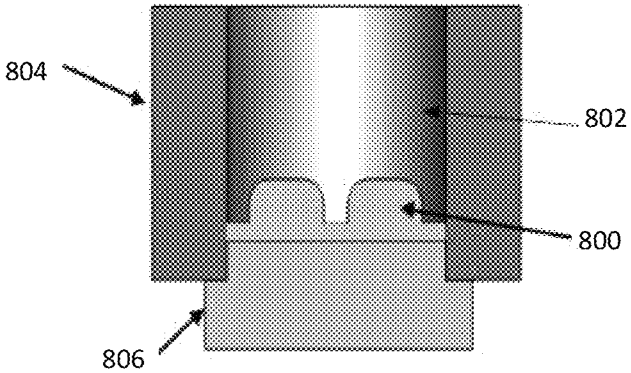
FIG. 8A-8E depicts an exemplary cold pressing process for forming a featured ceramic article using a graphite powder mold, in accordance with some embodiments of the current disclosure.
Figure 8B:
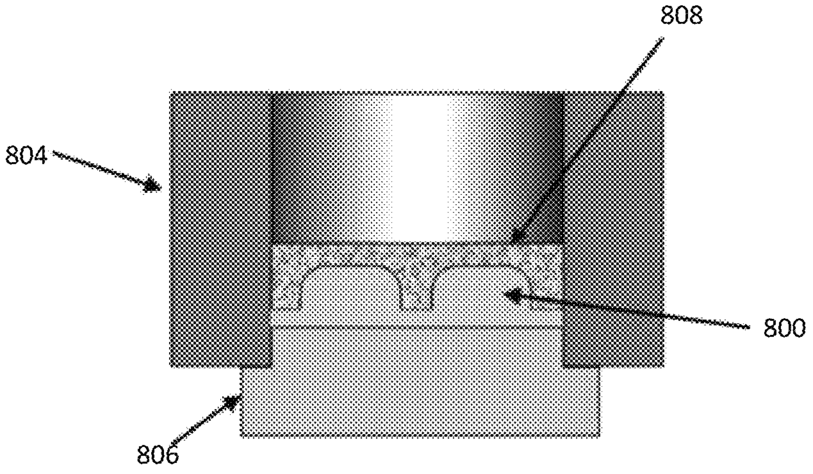
Figure 8C:
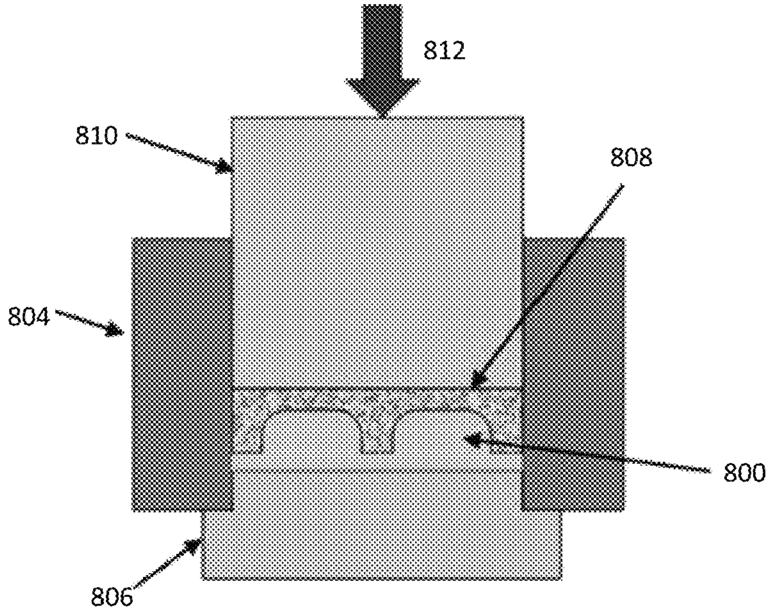
Figure 8D:
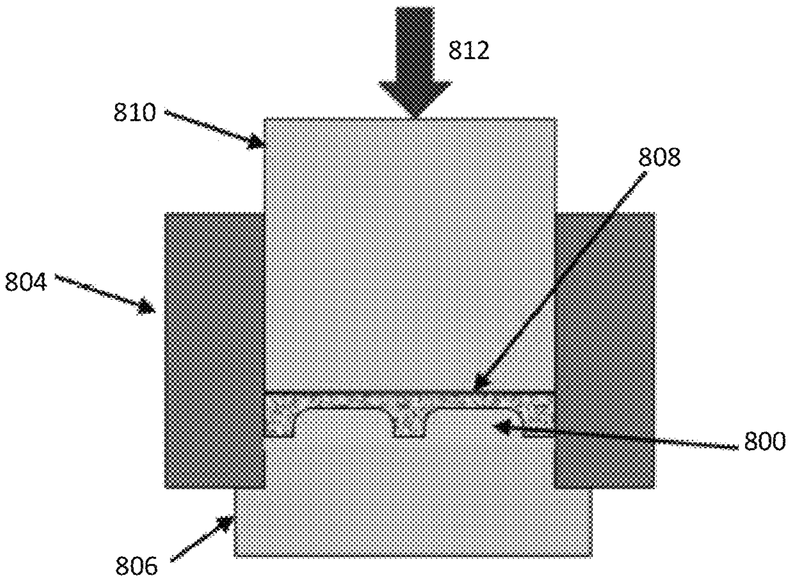
Figure 8E:
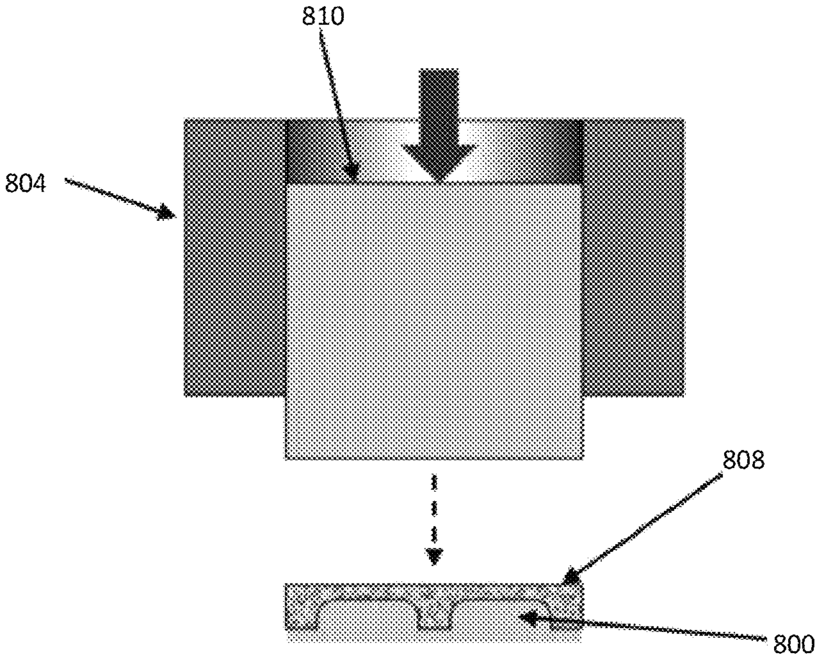

In embodiments, featured ceramic article is formed via a cold pressing process. FIGS. 8A-8E, depict an exemplary cold pressing process flow for forming a featured ceramic article. As depicted in FIG. 8A, a graphite powder mold 800 for forming features on the exterior of the ceramic article is placed in a cavity 802 of a pressing die 804. The pressing die 804 is closed with a plug 806. As depicted in FIG. 8B, a ceramic powder 808 is poured over the graphite powder mold 800 to at least completely cover the graphite powder mold 800. The amount of ceramic powder poured into the cavity 802 can vary based on the desired thickness of the target ceramic article. In some embodiments, the ceramic powder comprises ceramic particles, for example of boron carbide ($B_4C$), silicon carbide (SiC), alumina ($Al_2O_3$), or zirconia ($ZrO_2$), coated with an organic binder material, for example phenolic resin or polyvinyl alcohol (PVA). As depicted in FIG. 8C and FIG. 8D, a piston or ram 810 is inserted in the cavity 802 and a uniaxial force (AF) 812 is applied from above to compress the ceramic powder 808 with the mold 800 inside to form a pressed body. A reaction force or equal counteracting force AF (not shown) is supplied at the plug 806. In some embodiments, a pressure of about 30 MPa to about 130 MPa is applied to the ceramic powder 808. In some embodiments, a pressure of about 30 MPa to about 50 MPa is applied to the ceramic powder 808 to. In some embodiments, a pressure of about 70 MPa to about 130 MPa is applied to the ceramic powder 808. As depicted in FIG. 8E, the mold 800 and the featured ceramic article 808 are removed from the cavity 802. The mold 800 and the featured ceramic article 808 are subsequently separated.

Figure 9:
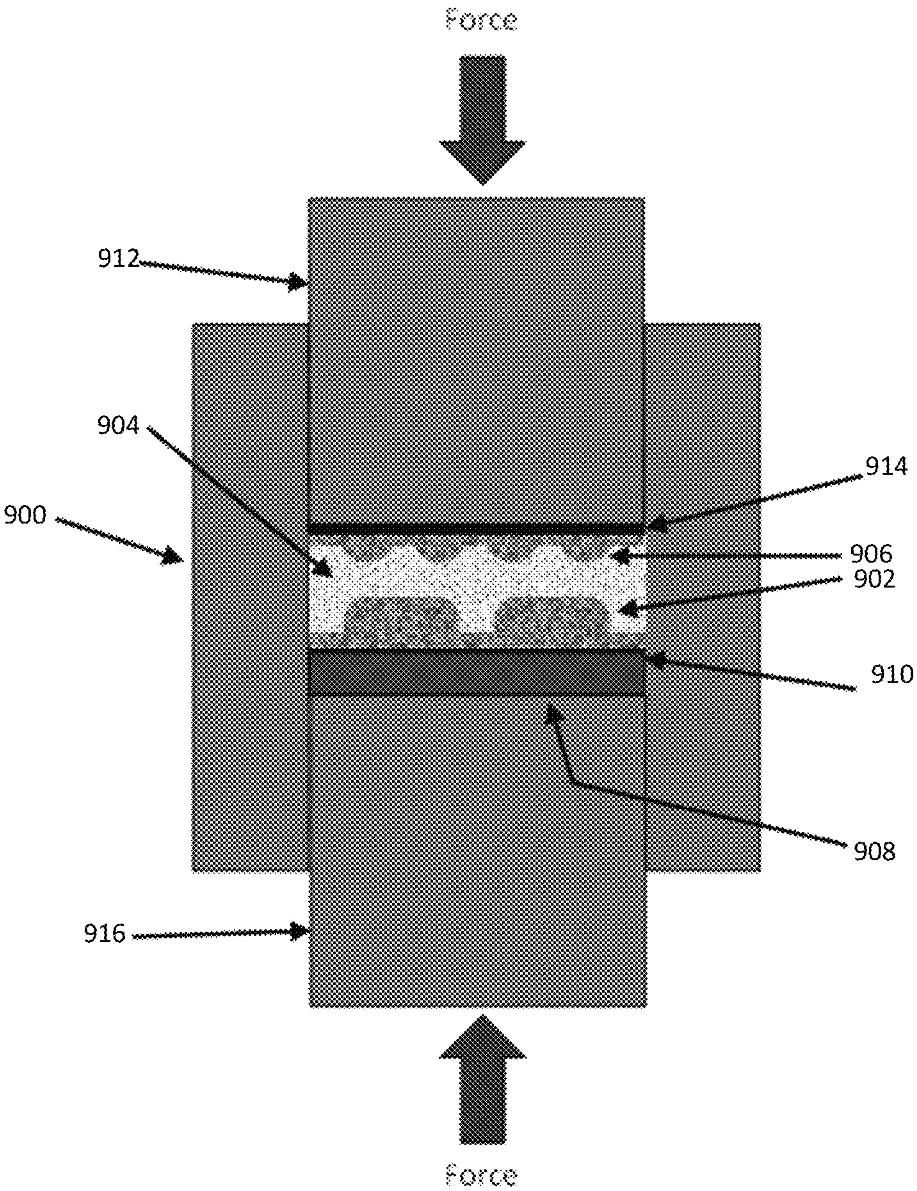
FIG. 9 depicts an exemplary process for forming a featured ceramic article using a graphite powder mold, in accordance with some embodiments of the current disclosure.

In some embodiments, a second mold may be used prior to applying a force to compress the ceramic powder, thereby forming features in both surfaces of the ceramic article. FIG. 9 depicts an exemplary hot-pressing die having a second graphite powder mold. The lower graphite powder mold 902 is positioned in the hot pressing die 900 on a graphite spacer 908 having a grafoil release sheet 910 between the graphite spacer 908 and the lower graphite powder mold 902 and then covered with ceramic powder 904. The upper graphite powder mold 906 can be pressed into the ceramic powder 904, at least partially displacing it so that ceramic powder 904 fills the space between the upper and lower graphite powder molds without any cavities or air gaps. A first piston or ram 912 applies uniaxial force (AF) from above to compress the ceramic powder 904. A second grafoil release sheet 914 may be positioned between the piston 912 and the upper graphite powder mold 906. A reaction force or equal counteracting force AF is supplied by a second piston or ram 916 to form the featured ceramic article.

Figure 10:
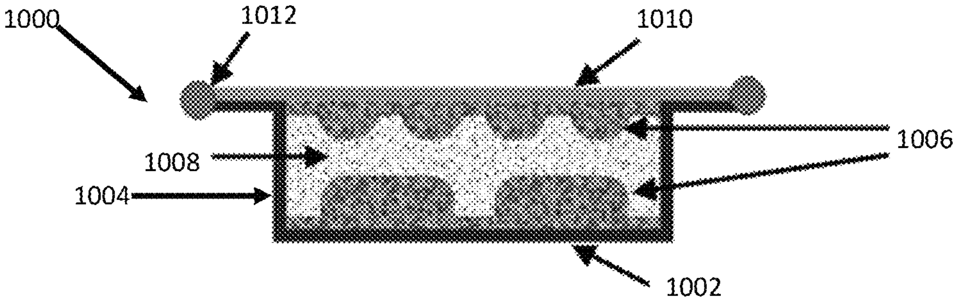
FIG. 10 depicts an exemplary process for forming a featured ceramic article using a graphite powder mold in accordance with some embodiments of the current disclosure.

In an alternative embodiment, the featured ceramic article is formed via a hot isostatic pressing process. FIG. 10 depicts an exemplary isostatic pressing container 900. The container 1000 has an open volume defined by a bottom surface 1002 and sidewalls 1004. A graphite powder mold 1006, formed as described in the embodiments above, is positioned within the open volume on the bottom surface 1002 of the container 1000. Ceramic powder 1008 is poured into the container 1000. In embodiments, a second graphite powder mold 1006 may be positioned atop the ceramic powder 1008 to form a ceramic article with additional features. The container 1000 is sealed 1012 with a lid 1010. The container 1000 is heated and compressed is an isostatic press chamber (not shown). The isostatic pressure causes the container 1000 to collapse uniformly in all directions so that the compressed ceramic powder takes the shape of the compressed container 1000. This provides a method for creating dense ceramic bodies with complex profiled exterior shapes. After ceramic powder compression and heating the container 1000 is cut away to release the featured ceramic article.

While exemplary embodiments and examples have been set forth for the purpose of illustration, the foregoing description is not intended in any way to limit the scope of disclosure and appended claims. Accordingly, variations and modifications may be made to the above-described embodiments and examples without departing substantially from the spirit and various principles of the disclosure. All such modifications and variations are intended to be included herein within the scope of this disclosure and protected by the following claims.

What is claimed is:

1. A method of forming a graphite powder mold, comprising:

applying a base layer to an exposed surface of a mold having one or more features;

depositing a graphite powder onto the base layer to fill the one or more features;

applying a cover layer onto an exposed surface of the graphite powder, wherein the cover layer and the base layer join at intersecting surfaces encasing the graphite powder to form the graphite powder mold having one or more raised features;

curing the base layer prior to depositing graphite powder onto the layer; and curing the cover layer after applying the cover layer onto the exposed surface of the graphite powder.

2. The method of claim 1, wherein the base layer and the cover layer comprise an adhesive material.

3. The method of claim 2, wherein at least one of the base layer or cover layer comprises graphite powder.

4. The method of claim 2, wherein the adhesive material has a thickness of about 0.1 to about 1.0 mm.

5. The method of claim 2, further comprising curing the base layer and the cover layer simultaneously.

6. The method of claim 1, wherein the base layer comprises a flexible graphite sheet having one or more features to match the one or more features of the mold.

7. The method of claim 6, wherein the cover layer comprises a flat flexible graphite sheet bonded to the base layer at intersecting surfaces by an adhesive material.

8. The method of claim 7, wherein the adhesive material comprises graphite powder.

9. The method of claim 1, wherein one of the base layer or the cover layer comprises an adhesive material and the other of the base layer or the cover layer comprises a flexible graphite sheet.

10. The method of claim 9, wherein the base layer comprises an adhesive material and the cover layer comprises a flat flexible graphite sheet.

11. The method of claim 9, wherein the base layer comprises a flexible graphite sheet having one or more features to match the one or more features of the mold and the cover layer comprises an adhesive material.

12. The method of claim 1, wherein the base layer comprises one of a paper material or a polymer material, the base layer having one or more features to match the one or more features of the mold, and wherein the cover layer comprises one of the paper material or the polymer material.

13. The method of claim 1, further comprising:

inserting the graphite powder mold into a hot-pressing die, wherein the graphite powder mold comprises a first surface having the one or more raised features and second surface opposite the first surface having one or more depressed features corresponding to the one or more raised features of the first surface, pouring a first layer of fill material into the hot-pressing die, wherein the fill material at least covers the one or more raised features of the graphite powder mold, applying a first pressure to the fill material in a direction perpendicular to the first surface, applying a second pressure to the graphite powder mold in a direction perpendicular to the second surface while applying the first pressure, and heating the fill material while applying the first pressure and second pressure to compress the fill material in a direction of the thickness of the fill material to form a final part.

14. The method of claim 13, further comprising:

removing the final part from the hot-pressing die, and removing the graphite powder mold to expose the features of the final part.

* * * * *